United States Patent Office 2,993,975
Patented July 25, 1961

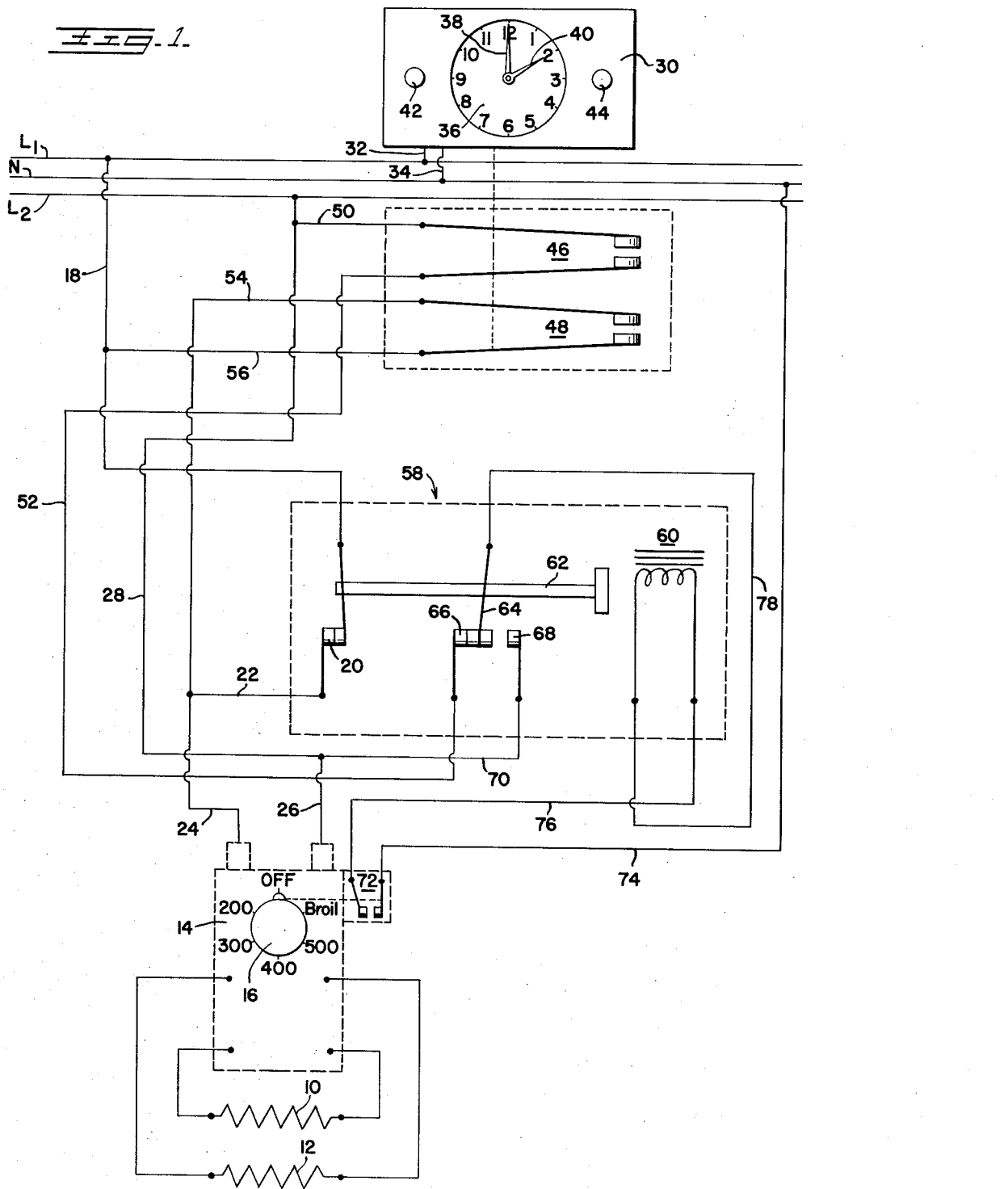

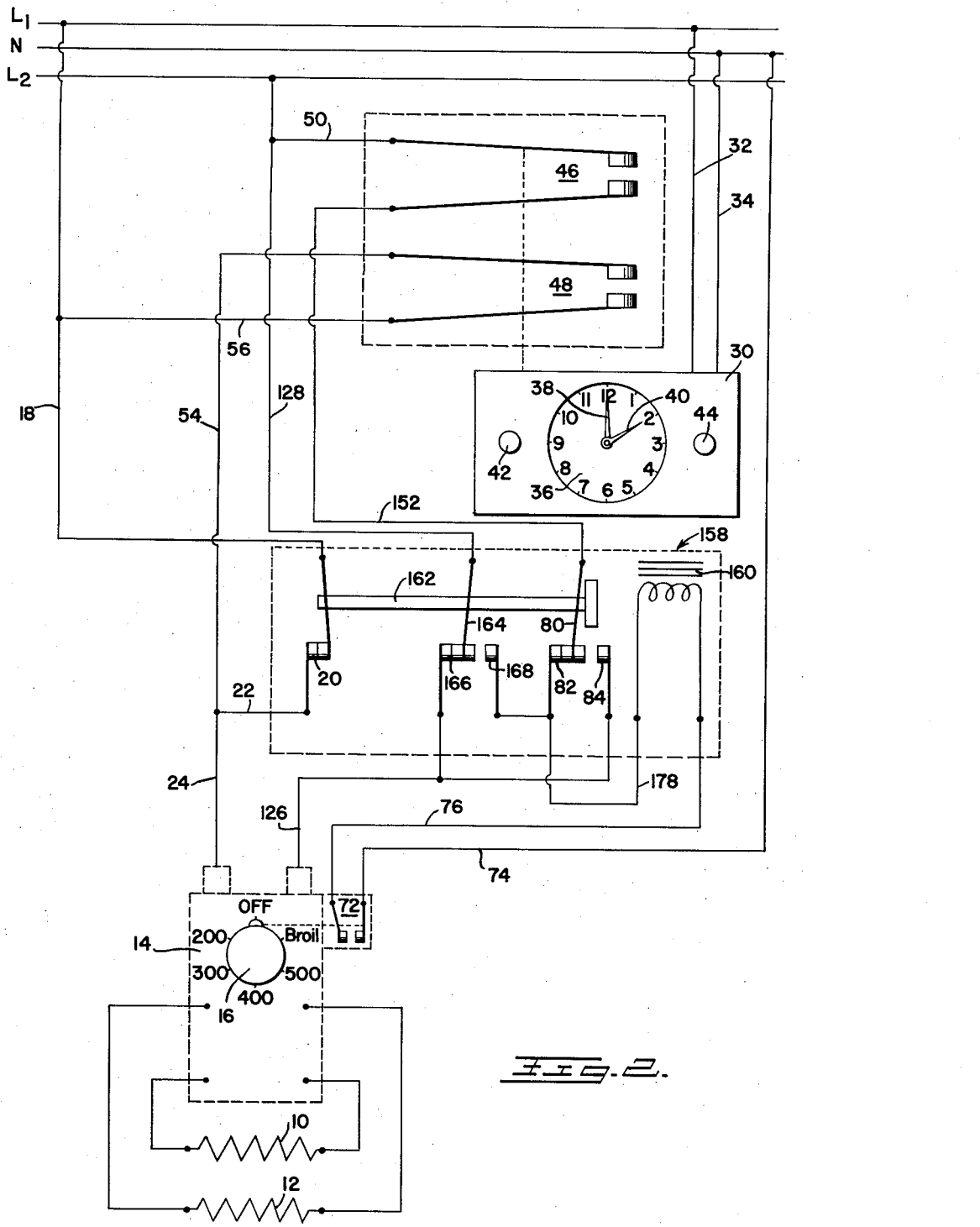

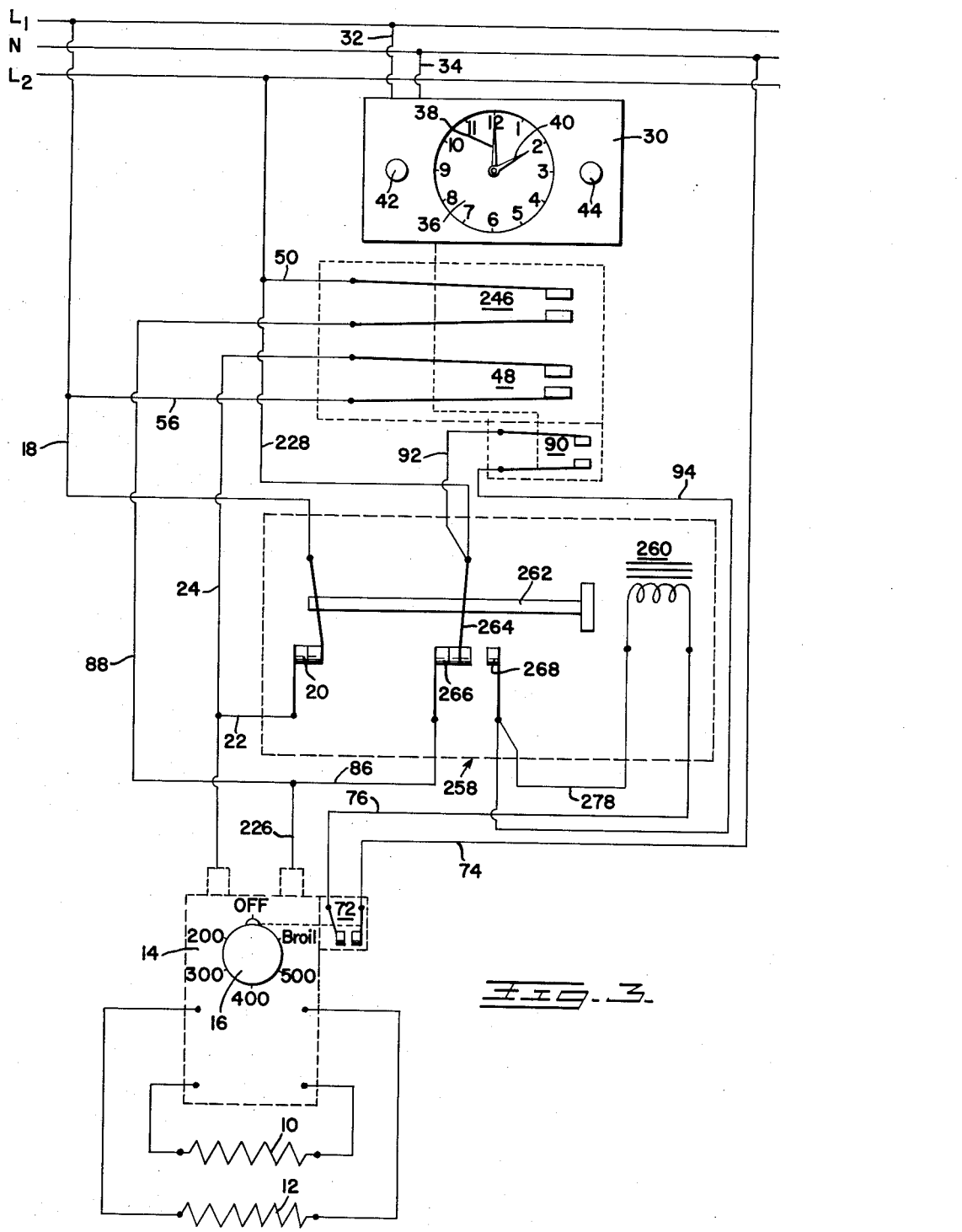

2,993,975
DOMESTIC APPLIANCE CONTROL
James F. Beal, Greensburg, Pa., assignor to Robertshaw-Fulton Controls Company, Richmond, Va., a corporation of Delaware
Filed Aug. 26, 1958, Ser. No. 757,380
6 Claims. (Cl. 219—20)

This invention relates generally to controls for domestic appliances and more particularly to controls for the heating means of an electric range or the like which is provided with timing means and thermostatic means.

Most modern electric ranges are provided with oven controls adapted to give timed as well as independent temperature controlled operation. In ovens of this character, the operator is usually required to set the timing means for the period of timed operation desired and, thereafter, following a period of timed operation, to manually set the timing means to a proper standby or manual position wherein independent temperature controlled operation can be performed. This latter requirement is often inadvertently forgotten and often results in wholly unnecessary service calls by utility and appliance repair personnel. It is, accordingly, an object of this invention to enable the operator of a domestic cooking range to perform an independent temperature controlled operation immediately following a timed cooking operation without the necessity of manually restoring the timing means to a manual position.

It is another object of this invention to energize a heating means, being time controlled, through an electrical circuit different from the one established for independent temperature control.

In the preferred embodiment of the invention, an electrical heating means, energized from a source of electric power, is controlled with a thermostatic means operable between an off position and a plurality of control positions, a timer means having an off time and adapted to be set to a plurality of preselected on times, and means operative by the thermostatic means and the timing means to establish a first and second circuit for energizing the heating means either solely under the influence of the thermostatic means or under the conjoint influence of the thermostatic means and the timer means.

Other objects and advantages will become apparent from the following description taken in connection with the accompanying drawings wherein:

FIG. 1 is a schematic showing of the preferred embodiment of this invention;

FIG. 2 is a view similar to FIG. 1 showing another modification of this invention; and FIG. 3 is a view similar to FIG. 1 showing still another modification of this invention.

Referring to FIG. 1, the preferred embodiment of this invention is shown as being utilized in a system for controlling the energization of a plurality of heating elements such as the broil and bake elements noted at 10 and 12 respectively, which may be disposed in an oven (not shown) or other heated chamber (not shown), the temperature of which is to be controlled. Elements 10, 12 may be energized from a suitable source of electric power such as a three-wire source of 110/220 volt, 60 cycle alternating current which may include two outside conductors L1 and L2 and a neutral conductor N.

A thermostatic switch 14 is operative to control the energization of heating elements 10, 12 from the source of power L1, L2 and may be of any construction which is well known in the electric range oven art, and therefore not shown in detail. The structure of thermostatic switch 14 may include thermostatic switching means and a bellows or diaphragm responsive to power derived from the flow or fluid to and from a bulb disposed in the oven or other heated chamber to turn heating elements 10, 12 on and off in response to temperatures in the oven so as to maintain a substantially constant selected temperature within the oven. The switching means and the bellows or diaphragm are capable of adjustment by the rotation of a knob or dial 16 in such a manner that when the knob 16 is in an off position, no electrical power can reach the heating elements 10, 12 regardless of the temperature in the oven. However, when the knob 16 is rotated to any one of a plurality of available temperature controlling positions, then the switching means of thermostatic switch 14 turn the heating elements 10, 12 on and off in response to fluid impulses from the bulb disposed in the heated chamber to maintain the heated chamber at substantially the temperature selected by the position of the knob 16.

For the purposes of this description, one terminal of thermostatic switch 14 is shown connected to conductor L2 of the source by wires 26 and 28 and to conductor L1 of the source by wire 24, wire 22, a switch means 20 and a wire 18. Although the heating elements 10, 12 are thus connected only across 220 volts by the thermostatic switch 14, it will be readily apparent to those skilled in the art that the neutral conductor N of the three-wire source can also be connected to the thermostatic switch 14 to obtain any desired heating arrangement of heating elements 10, 12.

A timing means 30, which may be a conventional design well known in the art, is connected to the three-wire source as by the conductors 32, 34 connecting conductors L1 and N, respectively. Timing means 30 comprises a clock dial 36 which may be of conventional design and cooperable therewith, an on indicator 38 and an off indicator 40 which may be positioned at different on and off times by manual manipulators 42 and 44, respectively. On indicator 38 and off indicator 40 are driven through their respective time cycles as preselected by manipulators 42, 44 by a conventional clock motor (not shown) which is connected across conductors 32, 34. Timing means 30 is operative to move a pair of switches 46, 48 between controlling positions to perform timed energization of the heating elements 10, 12 and to effect this timed energization, one side of switch 46 is shown connected to wire 28 by a wire 50 and the other side thereof is connected to a wire 52. Switch 48 is shown connected across wires 24, 18 by wires 54, 56, respectively.

Means are provided for automatically placing timing means 30 in control of thermostatic means 14 and may take the form of a relay indicated generally at 58. Relay 58 is shown comprising a coil 60 which is operative between energized and de-energized conditions for moving an armature 62 to the right and left respectively as viewed in FIG. 1. Armature 62 is operatively connected to switch means 20 and to a single-pole, double-throw switch which is shown comprising a switch arm 64 cooperable with a pair of stationary contacts 66, 68. Contact 68 is connected to wire 28 by a wire 70 and contact 66 is connected to wire 52. For purposes of this description, switch means 20 is considered to be in a closed position and switch arm 64 is considered to engage contact 66 when coil 60 is deenergized. When coil 60 is energized, switch means 20 will be in an open position and switch arm 64 will disengage contact 66 and engage contact 68. Switch arm 64 will, however, be adjusted to first engage contact 68 before it disengages contact 66 upon the energization of coil 60.

Means establishing a circuit for energizing the coil 60 of relay 58 may comprise a switch 72 operatively connected to the thermostatic switch 14 and shown as being mounted thereon. Switch 72 is operative between open and closed positions by the rotation of dial 16 between the off and the plurality of controlling positions and is shown connected to the conductor N by a wire 74 and to one end of coil 60 by a wire 76. The other end of coil 60 is connected to switch arm 64 by wire 78.

With all switch parts shown in their inactive or de-energized positions as indicated in FIG. 1, it will be made apparent that a circuit for energizing heating elements 10, 12 may be established by rotating the dial 16 of thermostatic switch 14 from the off position to one of the plurality of controlling positions. The circuit established can be traced from conductor L1, through wire 18, switch means 20, wire 22, wire 24, thermostatic switch 14, the broil and/or bake elements 10, 12, wire 26, and through wire 28 to conductor L2. Energization of elements 10 or 12 is thus accomplished depending upon the position of thermostatic switch 14. Thermostatic means 14 cycles between off and on positions in response to temperature variations in the oven or other heated chamber until such time as this operation is terminated by rotation of dial 16 to the off position thereby interrupting the circuit established between conductors 24 and 26.

If a timed heating operation is to be performed, as for instance a baking operation at 300° F. which is to begin at 2 o'clock and which is to terminate at 4 o'clock, the operator will manipulate on indicator 38 to the 2 o'clock position by manipulator 42 and off indicator 40 to the 4 o'clock position by the manipulator 44. When indicators 38 and 40 are thus set, timer 30 actuates switch 46 to a closed position, which position will be maintained until 4 o'clock or the conclusion of the timed baking operation. Switch 48 remains in the open position as indicated in FIG. 1 until 2 o'clock, the on time setting of on indicator 38, at which time it is actuated to a closed position by timer 30 and thereafter remains in the closed position until the conclusion of the timed baking operation, which in this instance is 4 o'clock.

When switch 46 is moved to the closed position, a circuit is established for energizing coil 60 of relay 58 and may be traced from conductor L2 through wire 28, wire 50, switch 46, wire 52, stationary contact 66, switch arm 64, wire 78, coil 60, and through the wire 76 to one pole of switch 72. In addition to setting the timing means 30 to the preselected future on and off times, the operator also sets thermostatic switch means 14 to a position which corresponds to the 300° F. temperature at which the baking operation is to be performed. In so doing, switch 72 is actuated to the closed position and the circuit from conductor 76 is completed through switch means 72 and wire 74 to the neutral conductor N. Coil 60 is energized and armature 62 thereof is attracted to the right as viewed in FIG. 1, thereby moving switch 20 to an open position and causing movement of switch arm 64 to the right to break the circuit between stationary contact 66 and switch arm 64 and establish a circuit between switch arm 64 and stationary contact 68. The circuit traced heretofore between conductors L1, L2 and thermostatic switch 14 is interrupted by the energization of coil 60 and the movement of switch 20 to the open position to prevent the flow of current for the thermostatic switch 14.

An alternate circuit for energizing coil 60 is established when coil 60 is energized and such circuit can be traced from conductor L2 through wire 28, wire 70, contact 68, switch arm 64, wire 78, coil 60, wire 76, switch 72, and through wire 74 to conductor N. Coil 60 is thus maintained energized even though the circuit between contact 66 and switch arm 64 is broken and the alternate circuit just described for coil 60 is maintained so long as switch 72 remains in a closed position.

Assume now that it is 1 o'clock when the timing means 30 and thermostatic switch 14 are set as above described. The circuits established will be maintained until 2 o'clock as set by on time indicator 38. At 2 o'clock, timing means 30 moves switch 48 to a closed position and, as is evident from the drawing, completes a circuit which can be traced through wire 56, switch 48 and wire 54 shunting switch 20 to energize bake element 12. Switch 48 will remain in the closed position until 4 o'clock, the off time setting of indicator 40 and bake element 12 will heat the oven or other heated chamber under the cycling control of thermostatic switch 14. At 4 o'clock, timing means 30 moves switches 46 and 48 to their open positions thereby terminating the timed heating operation. Movement of switch 46 to the open position does not affect the circuit of coil 60 in that the circuit between contact 66 and switch arm 64 had been broken heretofore by the energization of the coil 60. However, actuation of switch 48 to the open position interrupts the shunt circuit about switch 20 to break the circuit between line conductor L1 and thermostatic switch 14 to terminate the heating operation.

Thermostatic switch 14, however, remains in the 300° F. setting until the operator manipulates dial 16 to the off position and since it remains at the 300° F. setting, switch 72 will remain in the closed position to maintain the alternate circuit heretofore traced for energizing coil 60. Maintaining coil 60 energized until the operator returns the thermostatic switch 14 to the off position is necessary in that if coil 60 should be de-energized, the switch 20 would be allowed to close and in so closing, with the thermostatic switch 14 set to a baking operation, the heating element 12 would again be energized thus creating an obviously dangerous situation wherein the food being baked might be rendered worthless and, moreover, creating the possibility of fire in the oven or other heated chamber.

When the operator eventually does turn knob 16 to the off position, switch 72 will be moved to the open position, thereby de-energizing coil 60 to allow switch means 20 to return to a closed position and switch arm 64 to disengage contact 68 and engage contact 66. It will now be evident that subsequent heating operation under the independent control of thermostatic switch 14 can be performed by simply rotating knob 16 of thermostatic switch 14 to one of the plurality of heating positions. Since switches 46 and 48 are maintained in an open position, they do not affect the heating operation under the independent control of thermostatic switch 14 even though contact 72 is actuated to a closed position each time thermostatic switch 14 is set to one of the plurality of heating positions.

It will be noted that the modification of FIG. 1 was a single-pole switching arrangement, i.e., only the circuit between conductor L1 and thermostatic switch 14 was broken when the circuit was changed from the timed to the independent temperature controlled operations. In the following description of the various modifications of this invention, which are double-pole switching arrangements, similar reference numerals will be used to designate identical parts and reference numerals with the addition of 100 will be used to designate similar parts of the different modifications.

Thus, in FIG. 2, relay 158 is shown comprising a coil 160 which is operative between energized and de-energized conditions for moving an armature 162 from the right to the left, respectively, as viewed in the figure. Armature 162 is operatively connected to switch 20 and to a pair of single-pole double-throw switches which are shown comprising switch arms 164, 80, each cooperable with a pair of stationary contacts 166, 168, and 82, 84, respectively. In this modification, switch 20 will be in a closed position, switch arm 164 will engage contact 166 and switch arm 80 will engage contact 82 when coil 160 is de-energized. When coil 160 is energized, switch 20 will be moved to an open position, switch arm 164 will be moved to engage contact 168 thereby disengaging contact 166 and switch arm 80 will be moved to engage contact 84 thereby disengaging contact 82. Switch arms 164 and 80 will, however, be adjusted in a manner to allow switch arm 164 to first engage contact 168 before switch arm 80 disengages contact 82.

Conductor L2 is in this instance connected to switch arm 164 by a wire 128 rather than being connected directly to thermostatic switch 14 as in the prior modification. The circuit between conductor L2 and thermostatic switch 14 is completed by a wire 126 interconnecting contacts 166 and 84. Contacts 168 and 82 are connected together and further connected to one side of coil 160 by a wire 178. Switch arm 80 is connected to one side of switch 46 by a conductor 152.

When dial 16 of thermostatic switch 14 is rotated to one of the plurality of temperature controlling positions, a circuit for energizing either the broil and/or bake elements 10, 12 can be traced from conductor L1, through wire 18, switch 20, wire 22, wire 24, thermostatic switch 14, broil and/or bake elements 10, 12, wire 126, contact 166, switch arm 164 and through wire 128 to conductor L2.

When on and off time indicators 38 and 40 are rotated to some preselected on and off times, as for instance 2 o'clock and 4 o'clock, respectively, switch 46 is moved to the closed position by timing means 30 as in the prior modification to establish a circuit for energizing the coil 160 of relay 158. With dial 16 of thermostatic switch 14 rotated to a preselected baking temperature, as for instance 300° F., switch 72 will move to the closed position. The circuit for energizing coil 160 is thus established and may be traced from conductor L2, through wire 50, switch 46, wire 152, switch arm 80, contact 82, wire 178, coil 160, wire 76, switch 72 and through wire 74 to conductor N. Energization of coil 160 causes movement of armature 162 to the right as viewed in FIG. 2 and simultaneously therewith, switch 20 moves to the open position, switch arm 164 moves to disengage contact 166 and engage contact 168 and switch arm 80 moves to disengage contact 82 and engage contact 84. The circuit heretofore traced for energizing coil 160 is broken upon switch arm 80 disengaging contact 82 but prior thereto, contact 168 is engaged by switch arm 164 to establish an alternate circuit for energizing coil 160. This alternate circuit for energizing coil 160 may be traced from conductor L2 through wire 128, switch arm 164, contact 168, wire 178, coil 160, wire 76, switch 72, and through wire 74 to conductor N.

The normal circuits between conductors L1, L2 and thermostatic switch 14 are now broken in that switch 20 is now in an open position and the circuit heretofore established between contact 166 and switch 164 is broken. An alternate circuit between conductor L2 and thermostatic switch 14 is, however, established by the energization of coil 160 and may be traced from conductor L2, through wire 128, wire 50, switch 46, wire 152, switch arm 80, contact 84 and through wire 126 to the therostatic switch 14. The circuit between conductor L1 and thermostatic switch 14 will, however, not be established until the on time as selected by the on time indicator 38 is reached. At the on time, switch 48 is actuated to a closed position by timing means 30 thereby establishing a circuit for shunting switch 20 which may be traced from conductor 18 through wire 56, switch 48, and through wire 54 to wire 24. Energization of the bake element 12 will occur and the oven or other heated chamber will be heated thereby under the cyclic control of thermostatic switch 14.

At the off time, as set by off indicator 40, switches 46, 48 will move to an open position under the influence of timing means 30 and the circuits established in their closed positions between conductors L2, L1 and thermostatic switch 14 will be broken to terminate the timed baking operation. Coil 160, however, remains energized in that the circuit established by the closed position of switch 72 and the engagement of switch arm 164 with contact 168 is still maintained.

Threafter, when the operator rotates dial 16 to an off position, switch 72 will open to break the alternate circuit for energizing coil 160 causing movement of armature 162 in a manner to establish the circuit shown in FIG. 2.

In the modification shown in FIG. 3, a relay 258 is shown comprising a coil 260 which is operative between energized and de-energized conditions for moving an armature 262 from the left to the right, respectively. Armature 262 is operatively connected to switch 20 and to a single-pole, double-throw switch shown comprising switch arm 264 cooperable with a pair of stationary contacts 266, 268. In this modification, switch 20 is again operative to a closed position when relay 260 is de-energized and to an open position when coil 260 is energized. Switch arm 264 engages contact 266 in the de-energized condition of coil 260 and engages contact 268 in the energized condition of coil 260. A conductor 228 connects conductor L2 to switch arm 264 and the circuit between conductor L2 and thermostatic switch 14 is completed by conductors 86 and 226 interconnecting contact 266 and thermostatic switch 14. A wire 88 interconnects wire 226 and one pole of switch 246 and a wire 278 connects contact 268 and one side of the coil 260.

An additional contact 90 is operative by the timing means 30 and is shown interconnected between contact 268 and switch arm 264 by conductors 94 and 92, respectively. Switch 90 is operative in a manner to be in a closed position when on time indicator 38 is set to a preselected future on time and to be in an open position at the on time and in every other position of the on and off time indicators 38 and 40. Contact 246 in this instance is operable to a closed position only in the on time and is in an open position for every other setting of the on and off time indicators 38 and 40.

When dial 16 of thermostatic switch 14 is rotated to one of the plurality of temperature controlling positions, a circuit for energizing either the broil or the bake elements 10, 12 can be traced from conductor L1 through wire 18, switch 20, wire 22, wire 24, thermostatic switch 14, the broil and/or bake elements 10, 12, wire 226, wire 86, contact 266, switch arm 264, and through the conductor 228 to conductor L2.

When on and off time indicators 38 and 40 are rotated to some preselected on and off times, as for instance 2 o'clock and 4 o'clock respectively, timing means 30 moves switch 90 to the closed position to establish a circuit for energizing coil 260 of relay 258. Rotation of the dial 16 of thermostatic switch 14 to a preselected baking temperature, as for instance 300° F., moves switch 72 to the closed position and the circuit for energizing coil 260 can be traced from conductor L2, through wire 228, wire 92, switch 90, wire 94, wire 278, coil 260, wire 76, switch 72 and through wire 74 to conductor N. Energization of coil 260 causes movement of armature 262 to the right as viewed in FIG. 3 and simultaneously therewith switch 20 moves to the open position and switch arm 264 moves to the right disengaging contact 266 and engaging contact 268. An alternate circuit for energizing coil 260 can now be traced from conductor L2 through wire 228, switch arm 264, contact 268, wire 278, coil 260, wire 76, switch 72, and through wire 74 to conductor N. Although this alternate circuit for energizing coil 260 is established, the first described circuit for energizing coil 260 is not broken until the on time is reached and the switch 90 is moved to the open position by timing means 30.

When coil 260 is energized, switch 20 breaks the circuit between thermostatic switch 14 and conductor L1 whereas the breaking of the circuit between contact 266 and switch arm 264 breaks the circuit between conductor L2 and thermostatic switch 14. At the on time, as set by the on time indicator 38 of timing means 30, switches 246 and 48 move to a closed position and switch 90 moves to an open position. The closure of switch 246 establishes a circuit from conductor L2 to the thermostatic switch 14 which may be traced through wire 228, wire 50, switch 246, wire 88 and through wire 226 to thermostatic switch 14. A circuit from conductor L1 may be traced through wire 18, switch 48, and through wire 24 to thermostatic switch 14. At the off time as set by off time indicator 40 of timing means 30, switches 246 and 48 move to their open positions to break the circuits established between conductors L1, L2 and thermostatic switch 14 to terminate the timed heating operation.

Subsequently, when the operator rotates dial 16 of thermostatic switch 14 to the off position, switch 72 moves to an open position thereby breaking the alternate circuit for energizing coil 260 to cause de-energization thereof and movement of armature 262 in a manner to establish the circuit shown in FIG. 3.

The herein disclosed control systems, it will be noted, are inherently safe in operation and allow the operator complete freedom to perform either a timed heating operation or an independent temperature controlled heating operation without the necessity of manipulating any additional knobs or dials of a timer means other than are necessary to set the on and off times actually desired. Thus, the manual or reset position can be completely eliminated from the timing means. It will further be apparent that if the operator is accustomed to manually restoring the timing means to a manual position after a period of timed operation, the system herein disclosed will not require a new mode of operation because of the automatic restoration of circuitry to the manual position.

It will also be noted that the control systems herein disclosed may be readily adapted to any existing heating systems by the mere addition of an auxiliary contact to the thermostatic switch and by adapting the present contacts of existing timing means to operate in the manner disclosed herein. The fact that the relays 58, 158, and 258 are utilized only to interrupt control currents and not the power supply to the oven burners enables one to use a simple, standard low interrupting capacity relay. The power supply continues to be interrupted by the timing means contacts and the thermostatic switch contacts which are designed for that operation.

The illustrated embodiments of this invention may be variously changed and modified, or features thereof may be singly or collectively embodied in other combinations without departing from the scope of the invention. Accordingly, the disclosure herein is considered merely illustrative and the invention is to be limited only by the appended claims.

I claim:
1. In a control system for a heating means energized from a source of electric power, the combination comprising thermostatic means operable between an off position and a plurality of control positions for controlling the energization of the heating means, timer means having an off time and adapted to be set to a plurality of preselected future on times, and relay means operative by said thermostatic means and said timer means to establish a first circuit and a second circuit for controlling energization of the heating means solely under the influence of said thermostatic means and conjointly under the influence of said thermostatic means and said timer means respectively, said relay means being operative to establish said second circuit by the setting of said timer means to one of the plurality of preselected future on times when said thermostatic means is set to one of the plurality of control positions and to establish said first circuit when said timer means is in the off position and said thermostatic means is set to one of the plurality of control positions.

2. In a control system for an electrical heating means energized from a source of electric power, the combination comprising thermostatic means operable between an off position and a plurality of control positions for controlling the energization of the heating means, switch means operated between an open position and a closed position by operation of said thermostatic means between the off position and the plurality of control positions, timer means having an off time and adapted to be set to a plurality of preselected future on times, relay means operatively connected to said switch means and said timer means for operation between energized and de-energized conditions to establish a first circuit and a second circuit for energizing the heating means, said relay means being energized when said timer means is set to one of the plurality of future on times and said switch means is in the closed position to establish the first circuit whereby energization of said heating means is controlled conjointly by said thermostatic means and said timer means, said relay means being de-energized to establish said second circuit when said switch means is in the open position whereby energization of said heating means is controlled by said thermostatic means.

3. In a control system for a heating means energized from a source of electric power, the combination comprising a heating circuit adapted to supply current to the heating means and including first and second switch means connected in parallel and thermostatic means operably connected to supply current to the heating means only when said thermostatic means is in a controlling position and either of said switch means is closed, relay means operably connected to move said first switch means from a closed position to an open position in response to energization of said relay means, and timer means selectively movable between an off position and a future timed heating period position and being operable to close said second switch means at the beginning of the heating period, said timer means being further operably connected to energize said relay means upon said timer means being moved to the future timed heating period position.

4. In a control system for a heating means energized from a source of electric power, the combination comprising a heating circuit adapted to supply current to the heating means and including first switch means movable between an open position and a closed position, said heating circuit being provided with second switch means connected in parallel with said first switch means and being movable between an open position and a closed position, said heating circuit including thermostatic means movable between an off position and a plurality of controlling positions, said first and second switch means and said thermostatic means being operably connected to supply current to the heating means only when said thermostatic means is in a controlling position and either of said switch means is closed, relay means operably connected to move said first switch means from the closed position to the open position in response to energization of said relay means and to move said first switch means from said open position to said closed position in response to deenergization of said relay means, third switch means operably connected to control energization of said relay means and being movable between an open position and a closed position, and timer means movable between an off position and a future timed heating period position and being operable to close said second switch means at the beginning of the heating period, said timer means being further operably connected to move said third switch means from said open position to said closed position when said timer means is moved to said future timed heating period position.

5. In a control system for heating means energized from a source of electric power, the combination comprising a heating circuit adapted to supply current to the heating means and including first and second switch means connected in parallel and thermostatic means operably connected to supply current to the heating means only when said thermostatic means is in a controlling position and either of said switch means is closed, relay means operably connected to move said first switch means from a closed position to an open position in response to energization of said relay means, third switch means operably connected for controlling energization of said relay means, and timer means selectively movable between an off position and a future timed heating period position and being operable to close said second switch means at the beginning of the heating period, said timer means being further operable to close said third switch means upon said timer means being moved to the future timed heating period position, and said timer means being operable to move said second switch means and said third switch means to an open position at the end of the timed heating period.

6. In a control system for heating means energized from a source of electric power, the combination comprising heating circuit means including first and second switch means and thermostatic means, each of said first and second switch means being movable between open and closed positions, said thermostatic means being selectively movable between an off position and a controlling position, said first and second switch means and said thermostatic means being operably connected to supply current to the heating means only when said thermostatic means is in a controlling position and either of said switch means is closed, relay means operably connected to move said first switch means to the open position in response to energization of said relay means, second circuit means for controlling energization of said relay means and including third switch means movable from an open position to a closed position in response to movement of said thermostatic means to the controlling position, said second circuit means including fourth switch means operably connected to energize said relay means when said third switch means is closed, and timer means operably connected to said second switch means and said fourth switch means to move said second switch means to its closed position at a predetermined time and to move said fourth switch means to its closed position when said timer means is set to the time at which said second switch means is to be closed.

References Cited in the file of this patent

UNITED STATES PATENTS

| | | |
|---|---|---|
| 1,671,593 | Kercher et al. | May 29, 1928 |
| 2,392,166 | Lockwood | Jan. 1, 1946 |
| 2,663,786 | Illian et al. | Dec. 22, 1953 |
| 2,721,926 | Baird | Oct. 25, 1955 |
| 2,742,558 | Simmons | Apr. 17, 1956 |
| 2,817,401 | Ostrander | Dec. 24, 1957 |